C. H. SCHOL.
ART OF CONVERTING MOLTEN SLAG INTO A HIGHLY POROUS MASS.
APPLICATION FILED SEPT. 15, 1915.
1,163,605.  Patented Dec. 7, 1915.
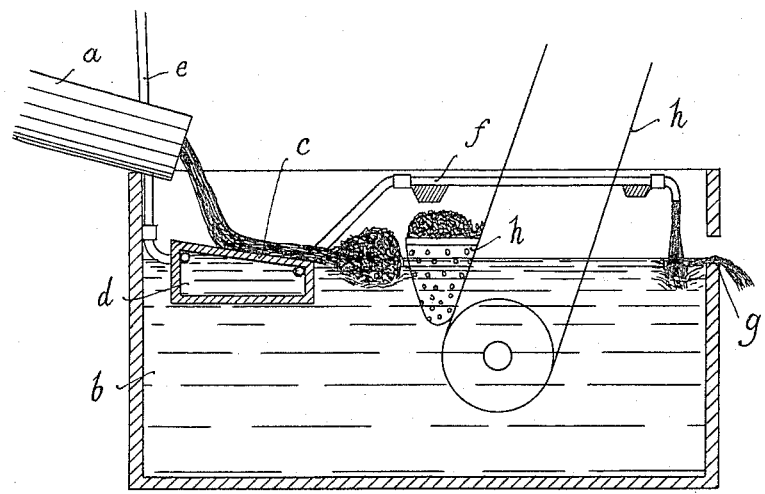
Inventor:
Carl H. Schol,
By Bacon Milans attys.

UNITED STATES PATENT OFFICE.

CARL H. SCHOL, OF ALLENDORF, GERMANY.

ART OF CONVERTING MOLTEN SLAG INTO A HIGHLY-POROUS MASS.

1,163,605.　　　　　Specification of Letters Patent.　　Patented Dec. 7, 1915.

Application filed September 15, 1915. Serial No. 50,888.

*To all whom it may concern:*

Be it known that I, CARL HEINRICH SCHOL, manufacturer, a subject of the German Emperor, and residing at Allendorf, Dillkreis, Germany, have invented certain new and useful Improvements in the Art of Converting Molten Slag into a Highly-Porous Mass, of which the following is a specification.

My invention relates to a process of converting molten slag into a highly porous mass.

For manufacturing light bricks of the type of the so-called Rhenish tuff bricks it has been proposed to convert blast furnace slag or the like into a highly porous mass. The granulating of slag by conducting the same into water is well-known. The sudden quenching of the slag prevents obtaining of a highly porous structure which is necessary for the purpose mentioned above. It has therefore been proposed already to subject the molten blast furnace slag, conducted into water, to the action of compressed air rising from the bottom of the reservoir in a finely divided state so that the lumps of slag floating on the surface are caused to swell by the action of steam and air simultaneously.

I have now found that in order to obtain a structure as porous as possible it is necessary to prevent the formation of a glassy layer on the under surface of the slag which is formed regularly in the granulating processes used hitherto as soon as the slag comes into contact with the water and which layer prevents entering of the water into the interior of the slag. In order to convert the slag into a porous mass it has been necessary up to now to break up this hard glassy layer, so as to allow the water entering into the interior of the slag.

The object of my invention is therefore to convert the slag slowly into a porous mass, instead of suddenly, so that the time of action of the steam produced upon the slag is extended as long as possible for the purpose of obtaining a swelling of the slag as far as possible.

Contrary to the old process according to which the slag is plunged into cold water from a considerable height, the new process consists mainly in this that the slag is conducted into the granulating water in a level which is approximately equal to that of the water, and that the granulating water in that part of the receptacle, where the slag is introduced has a temperature which is as near as possible to that of the boiling point of water.

It has already been proposed to introduce the slag into the water from a level approximately equal to that of the water surface, but this was intended only to prevent sinking of the slag in which case the slag was taken off the water surface before it sunk. This known process of introducing the slag into the granulating water has been proposed and is suitable for the production of cement. According to the present invention the slag is introduced in the same manner, but is subjected to the action of the steam, generated by the contact of the molten slag with the water, for a longer period of time in order to obtain a structure as porous as possible.

In order to convert the slag into a porous mass it has also been proposed to first prepare the slag in a drain-pond and then to introduce it into the second pond filled partly with water, where it is converted into a porous mass. Hereby the water is heated as this is always the case when introducing slag. This process described on pages 429 and 430 of the book "*Die Chemische Technologie der Mörtelmaterialien*," edited by Feichtinger, in 1885 does not allow uninterrupted working. The essential point is however that the slag does not come into contact with highly heated water at once, but that the slag brings the water gradually to a relative high temperature. In the granulating processes known hitherto, cold water is always introduced together with the slag, as the slag takes with it a great amount of the water, and fresh water always must flow in. The fresh water flowing in is afterward heated by the slag already converted into a solid mass, so that in the processes known hitherto the slag introduced comes into contact with cold water always.

In contradistinction to the known processes the feature of my invention consists in this that in the moment of introducing, the slag comes into contact with hot water the temperature of which is as near as possible to that of the boiling point, so that steam may be produced as soon as the slag enters the water and that first of all the contacting surface of the slag remains soft and quenching is prevented which is always the case in the known processes. The slag may also be caused to flow across an inclined perforated surface through the holes of which steam under a certain pressure rises from below, causing it to swell to large porous lumps. The steam must however not be introduced under too high a pressure as otherwise the large lumps which I intend to receive will not be produced, but the slag will be dispersed and crushed.

In carrying out the process different forms may be adapted; it is however necessary that the steam easily penetrates the slag from below and causes it to swell considerably without effecting a dispersing or crushing of the slag. After swelling the material may be conveyed to the place of further treatment by means of a conveyer or the like.

The figure is a longitudinal sectional view of the preferred apparatus capable of carrying out the present process.

The trough or channel $a$ conveying the slag from the blast furnace to the water receptacle $b$ terminates as this is usually the case in a level a little above the water level. The slag does not plunge into the water directly, but falls upon an inclined surface or wall $c$ projecting only a little above the water level. As shown in the drawing, the surface or wall $c$ belongs to a box-like reservoir $d$ to which the granulating water is conducted by means of a pipe $e$ for the purpose of cooling at least the under side of the inclined surface $c$ to such an extent that it can not be destroyed by the molten slag with which it comes into contact. The inclined surface $c$ may however not be cooled so far that the slag is quenched when coming into contact therewith.

The water in the reservoir $d$ is of course highly heated and is conducted by a pipe $f$ to a place in the receptacle $b$ which is spaced apart as far as possible from the point of introduction of the slag into the water. This is preferably because the water at the point of introduction of the slag is highly heated and in any case is warmer than the water heated in the reservoir $d$ only. According to the present invention however the slag must on entering the receptacle $b$ at once come into contact with water heated as high as possible.

An overflow $g$ serves the purpose of maintaining the water in the receptacle $b$ at a constant level always. The foamy slag is taken off the water and conveyed to any desired place by means of an elevator $h$ of suitable construction.

The reservoir $d$ provided with the inclined surface or wall $c$ is in this case replaced by a box $i$ into which steam under the required pressure is introduced by means of a pipe $k$. The front part of the box $i$ is provided with an inclined hollow wall $l$ which may be cooled by water. The inclined wall $l$ is provided with a great amount of perforations $m$ through which the steam may escape. The trough or channel $a$ in this case is so arranged that the slag drops directly upon the inclined wall $l$ over which it flows into the receptacle $b$. Hereby the slag is subjected to the action of the steam passing through the holes $m$ and is caused to swell before the same passes into the granulating water within the receptacle.

It will be understood that the plants described for carrying out the new process may be substituted by any other suitable plant.

I claim:—

1. The process of converting blast furnace slag into a highly porous mass, which consists in introducing the slag into highly heated granulating water.

2. An apparatus for converting blast furnace slag into a highly porous mass comprising a receptacle having granulating water therein, a reservoir within the receptacle and having one of its walls lying near the surface of the granulating water over which the molten slag passes into the receptacle to heat the water beneath the said wall, and means communicating with the reservoir for transferring a portion of the heated water therein to the receptacle.

3. An apparatus for converting blast furnace slag into a highly porous mass comprising a receptacle having granulating water therein, a reservoir having an inclined upper wall positioned near the surface of the water within the receptacle and over which the slag flows into the receptacle to heat the water in the reservoir beneath the said inclined wall, and means for transferring a portion of the heated water under the inclined wall to a point distant to where the slag is introduced into the receptacle.

4. An apparatus for converting blast furnace slag into a highly porous mass comprising a receptacle having granulating water therein, means for supporting the slag while the same flows near the surface of a portion of water within the receptacle to heat the water beneath the slag before the slag is deposited within the receptacle, and means for transferring a portion of the water heated by the flowing slag to a point distant from where the slag is introduced in the receptacle.

In testimony whereof I have affixed my signature in presence of two witnesses.

CARL H. SCHOL.

Witnesses:
B. JOLKRDORF,
E. FRANTZ.